United States Patent [19]

Denham

[11] 4,309,720
[45] Jan. 5, 1982

[54] APPARATUS AND METHOD FOR PRODUCING AN IMAGE ON A SENSITIZED SURFACE

[75] Inventor: Dan F. Denham, Portland, Oreg.

[73] Assignee: Tektronix, Inc., Beaverton, Oreg.

[21] Appl. No.: 112,366

[22] Filed: Jan. 15, 1980

Related U.S. Application Data

[63] Continuation-in-part of Ser. No. 932,148, Aug. 9, 1978, abandoned, which is a continuation of Ser. No. 692,399, Jun. 3, 1976, abandoned.

[51] Int. Cl.³ .............................................. H04N 1/46
[52] U.S. Cl. ......................................... 358/75; 358/78
[58] Field of Search ....................... 358/6, 75, 78, 302, 358/244, 66, 68

[56] References Cited

U.S. PATENT DOCUMENTS

| | | | |
|---|---|---|---|
| 2,531,031 | 11/1950 | France et al. | 358/6 |
| 2,638,498 | 5/1953 | France et al. | 358/6 |
| 2,883,451 | 4/1959 | Keizer | 358/68 |
| 3,005,042 | 10/1961 | Horsley | 355/20 |
| 3,210,597 | 10/1965 | Siegmund et al. | 358/242 |
| 3,239,606 | 3/1966 | Chatten et al. | 358/75 |
| 3,679,824 | 7/1972 | Gibson | 358/256 |
| 3,911,480 | 10/1975 | Brucker | 358/75 |

*Primary Examiner*—John C. Martin
*Attorney, Agent, or Firm*—Thomas J. Spence

[57] ABSTRACT

A system and method of same for converting an electrical signal defining a refreshed raster-scan image of n differentiable components, for example, colors, into a permanent hard-copy representation of such image in terms of the cumulative sum of such components. Successive segments of a raster-scan image are scrolled across the display screen of a cathode-ray tube whose target structure comprises n adjacent strips of different phosphor materials so as to successively expose a sensitized medium scrolled at the same rate adjacent the screen to each component of each segment of the image, thereby producing in such medium a copy of such image.

22 Claims, 6 Drawing Figures

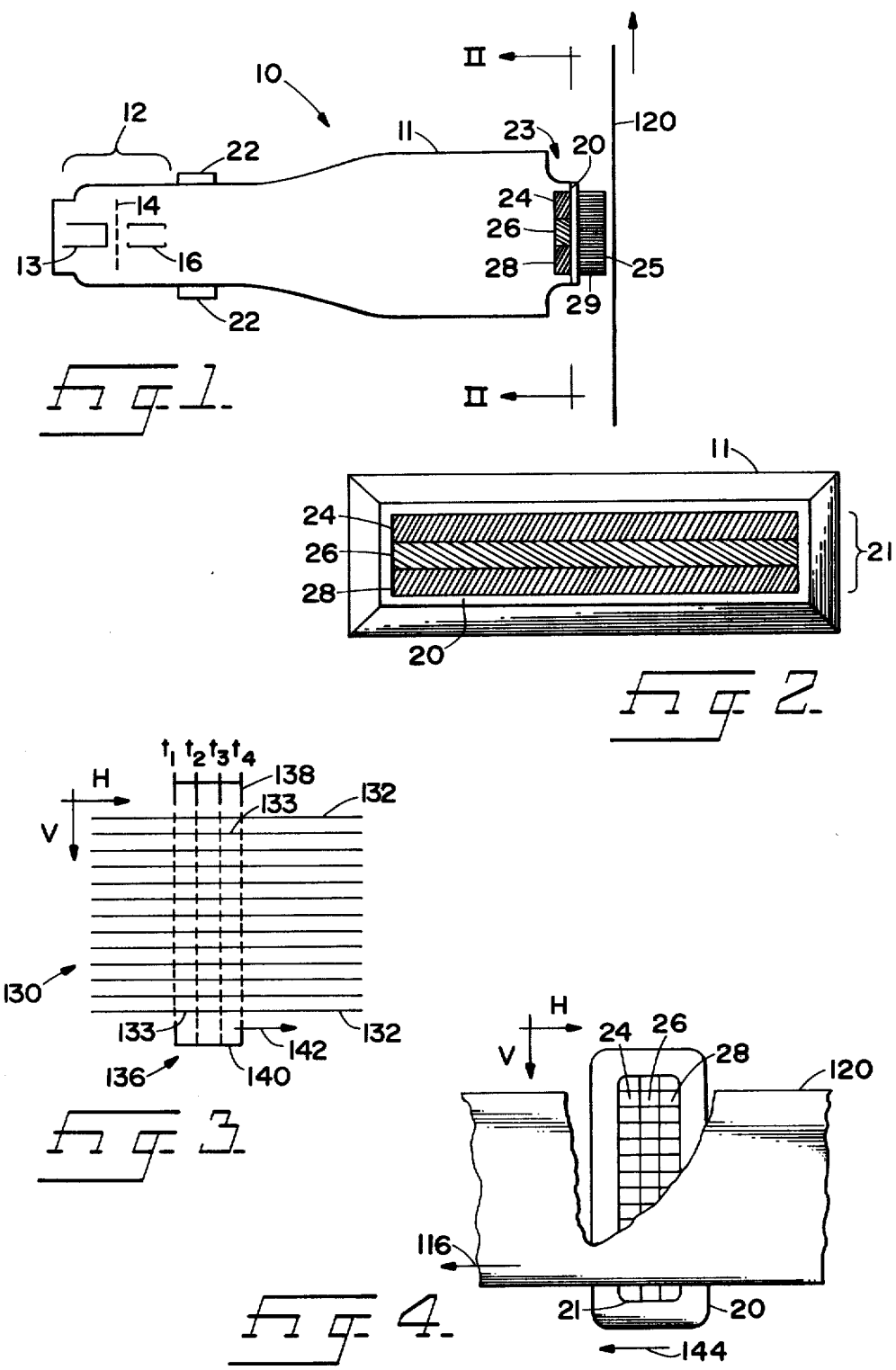

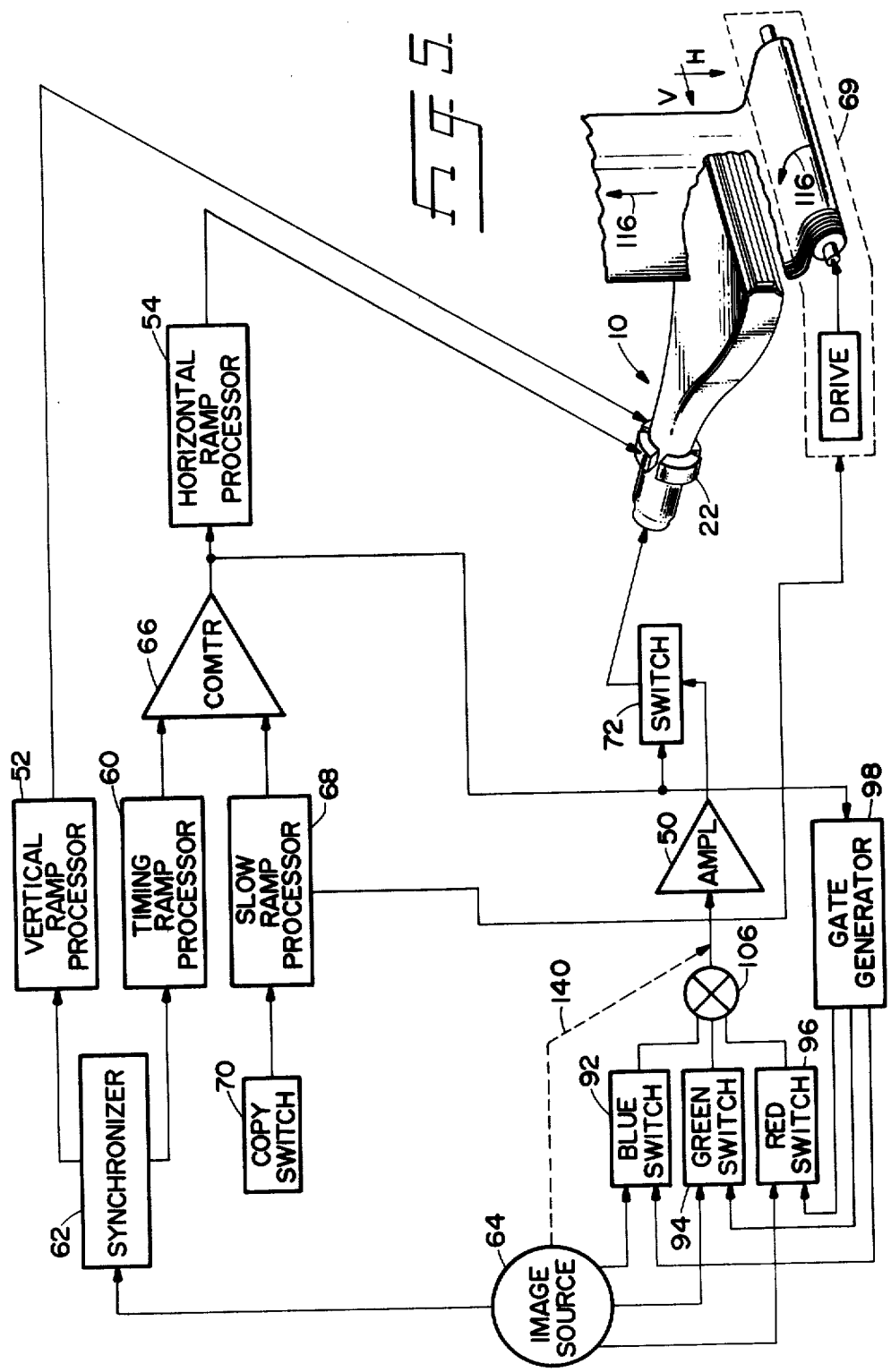

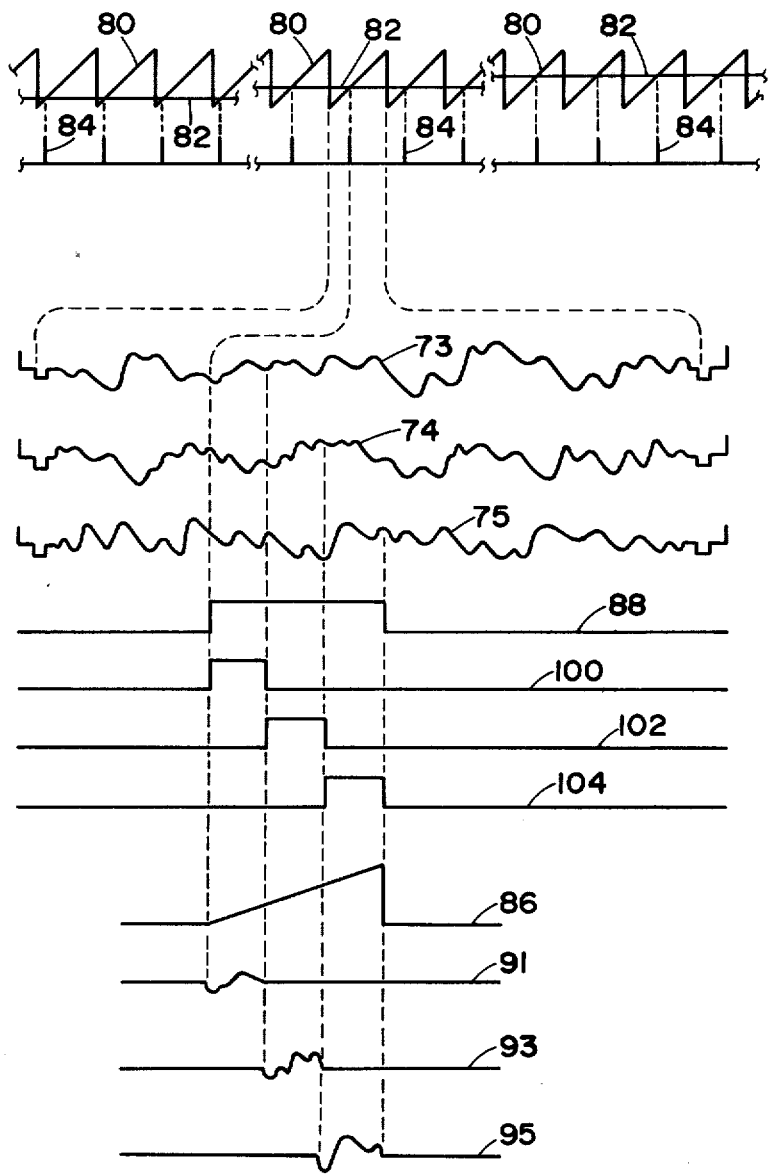
Fig. b ized surface. When using an ink-based printing system or similar output device in place of the CRT-based system described above, the same principles apply.

APPARATUS AND METHOD FOR PRODUCING AN IMAGE ON A SENSITIZED SURFACE

RELATIONSHIP TO PREVIOUS APPLICATIONS

This application is a continuation-in-part of application No. 932,148 filed Aug. 9, 1978, now abandoned, which was a continuation of application No. 692,399 filed June 3, 1976, now abandoned.

BACKGROUND OF THE INVENTION

The subject matter of the present invention pertains to means for converting an electrical signal defining a refreshed raster-scan image into a permanent hard-copy representation of such image.

Known examples of such systems include those disclosed by Japanese patent publication No. 47562/74, Gibson U.S. Pat. No. 3,679,824, and Unger et al U.S. Pat. No. 3,811,007, the latter two of which are assigned to the assignee of the present invention. In each of the identified systems, successive portions or slices of an image to be copied are displayed on a display screen and then moved across the screen at a speed synchronous with the movement of a recording medium disposed adjacent the screen. In this manner, an image larger than the screen itself can be scrolled across the screen so as to produce in the similarly scrolled recording medium a reconstructed representation of the entire image. A common disadvantage of such systems is their inability to produce color copies of color images.

Other prior art systems of some pertinency include those disclosed by U.S. Pat. Nos. 3,716,664; 3,685,899; 3,006,260; 2,878,309; 2,600,868; and 2,531,031. Typical of these systems is that of U.S. Pat. No. 3,685,899 wherein a special form of field sequential video color is recorded on standard black and white film as a black and white separation master using a continuous film motion electronic beam recorder, and then a standard color film is made from the separation master by exposing each frame of the film in sequence to red, green, and blue separation images using appropriate color filters. A disadvantage of such a field sequential color system is its requirement for special lenses, color wheels, or three-gun continuous film motion recorders, each of which adds to the size and cost of the resultant system.

A further example of a motion picture printer is that disclosed in Horsley U.S. Pat. No. 3,005,042 wherein three electrical signals representing the three primary colors of an image appearing on a first color film are converted via three single-color cathode-ray tubes into a composite image fragment for presentation to a second color film. With both films scrolled past their respective input and output stations at the same speed, the image information from the first film can be effectively transferred to the second. A principal disadvantage of the Horsley system is its requirement for three separate cathode-ray tubes to produce the composite image fragment. Although Horsley indicates that a conventional shadow mask type tricolor cathode-ray tube, using three electron guns, could be employed in place of the three separate tubes, such a single tube would not provide the same degree of resolution in the image produced or permit the same flexibility of color balance or other incidental adjustments.

SUMMARY OF THE INVENTION

The present invention is directed to a unique system and method of same for converting an electrical signal defining separate differentiable components of a refreshed raster-scan image into a permanent hard-copy composite representation of such image. More particularly, the system of the present invention comprises means for receiving a signal defining the image to be produced in terms of a plurality of preselected differentiable components, a cathode-ray tube having a display area composed of a like plurality of separate bands of different phosphorescent materials, and means responsive to the received image signal for causing each component of successive segments of the image to be scrolled across its respective phosphor band in a manner producing in a sensitized material, scrolled past the display area at the same rate, a permanent hard-copy representation of the entire image as defined by the cumulative sum of its component parts. In the usual case, the image being processed is defined in terms of its three primary colors and the display area of the cathode-ray tube is composed of only three phosphor bands; however, more or other components of the input image, for example, its ultraviolet and infrared components, may be treated in a similar manner by the use of appropriate phosphors and sensitized media.

For a three-color system, the three phosphor bands of the cathode-ray tube are arranged over the faceplate of the tube in mutually parallel juxtaposition so as to form an elongate display area, the longest dimension of which is parallel to the longitudinal axis of each band. This area is scanned by a beam from a single electron gun at a first fast rate laterally across the bands and at a second slower rate longitudinally along the bands so as to produce in the area an aligned array of short raster-line segments. For ease of understanding, the raster-line array thus produced may be thought of as a vertical segment or time slice of a conventional raster scan display presentation.

During operation of the system, gating circuitry acts to ensure that the density of the electron beam is modulated according to a particular image component, i.e., color signal, only when the beam is scanning across the phosphor band related to that component, with each horizontal or fast sweep of the beam causing the beam to traverse each of the three phosphor materials in sequence. In a three-color system with the phosphor bands arranged, for example, in blue, green, red (BGR) order, each displayed image segment is divided into three sections, with the first section defined by its blue component, the second by its green component, and the third by its red component.

To produce a hard-copy representation of a full-color image, the successive segments of the input image are caused to move across the display area in synchrony with the movement of the sensitized medium so as to sequentially expose the medium to each component of each section and, ultimately, the entire image. A monochromatic image may be produced by modulating the density of the electron beam without regard for the particular phosphor being scanned, or by using a monochromatically sensitive medium.

Although the system of the present invention is discussed in terms of processing a vertical segment of a raster-scan image, it will be apparent that the same system may be employed to process a horizontal segment of such an image merely by reversing the output scanning order; that is, by causing the electron beam in the cathode-ray tube to scan the tube display area at a first fast rate longitudinally along the phosphor bands and at a second slower rate laterally across the bands.

It is, therefore, a principal objective of the present invention to provide an improved image-producing system employing a single gun multiphosphor cathode-ray tube to produce a permanent hard-copy representation of a raster-scan color image.

It is an additional principal objective of the present invention to provide an improved method of producing such a copy.

It is a further objective of the present invention to provide an improved system for converting an electrical signal representing a plurality of differentiable components of a raster-scan image into a permanent hardcopy representation of such image in terms of the cumulative sum of such components.

The foregoing objectives, features, and advantages of the present invention will be more readily understood upon consideration of the following detailed description of the invention taken in conjunction with the accompanying drawings.

BRIEF DESCRIPTION OF THE DRAWINGS

FIG. 1 is a simplified partially sectioned side view of the cathode-ray tube employed in the system of the present invention.

FIG. 2 is a sectional view of the display area of the cathode-ray tube of FIG. 1.

FIG. 3 is a conceptual representation of a conventional raster-scan presentation.

FIG. 4 is a front view of the cathode-ray tube of FIG. 1 disposed adjacent an elongate sheet of sensitized medium.

FIG. 5 is a simplified diagrammatic representation of the system of the present invention.

FIG. 6 is a series of electrical waveforms produced in the system of FIG. 5 during its operation.

DETAILED DESCRIPTION OF THE PREFERRED EMBODIMENT

Referring first to FIGS. 1 and 2, there is shown in simplified form a partially sectioned elevation of the cathode-ray tube 10 employed in the preferred embodiment of the present invention. As disclosed, the tube includes an evacuated envelope 11 enclosing a single writing gun 12 comprising a cathode 13, a control grid 14, and a focusing/accelerating anode structure 16 for forming a narrow writing beam of high velocity electrons which may be caused to strike a target structure 23 comprising three elongate bands or strips 24, 26, 28 of different phosphorescent materials deposited on the inner surface of a face plate 20. As shown most clearly in FIG. 2, the three phosphor bands 24–28 are arrayed in mutually parallel juxtaposition so as to form an elongate display area or screen 21, the longest dimension of which is parallel to the longitudinal axes of the three bands. For clarity, the three phosphor bands of FIG. 2 have been cross-hatched to correspond to the sectional shading of FIG. 1. Each band is formed of a conventional phosphorescent material selected to produce upon excitation radiant energy having a wavelength different from that produced by the other selected materials. Preferably, the display area 21 defined by the bands is overlain with a plurality of fiber optic material 29 to present at a surface 25 a focused reproduction of an image produced within the area. Also shown in FIG. 1 is a deflection yoke 22 or other suitable means for deflecting the beam within the tube, and a sensitized sheet medium 120, the function of which is explained in detail below.

Attention is directed next to FIGS. 3 and 4 wherein there is disclosed the underlying concept of the present invention. In FIG. 3 there is shown a simplified representation of a conventional raster-scan presentation 130 comprising a series of aligned raster lines 132, with each line being oriented in a horizontal direction, indicated by the arrow labeled H, and spaced from the other lines in the array in a vertical direction, indicated by the arrow labeled V. It is understood that the horizontal and vertical directions are selected for ease of explanation only and that any two mutually orthogonal directions may be chosen without departing from the scope of the invention as disclosed.

In a conventional display environment, the presentation 130 is formed by simultaneously sweeping an electron beam across a cathode-ray tube display screen from left to right, as viewed in the figure, at a first fast rate to form each line and from top to bottom at a second slower rate to form the entire array. Also shown in FIG. 3 is an imaginary segment or time slice 136 of the raster-scan presentation 130, the segment being identified in dashed outline as that portion of the presentation appearing between the brackets 138 and 140. As so identified the presentation or image segment 136 comprises a vertically aligned array of horizontal line segments 133, with each segment being defined as that portion of a respective raster line 132 occuring between times $t_1$ and $t_4$ as labeled in the figure. As is discussed below, each line segment 133 is further divided into three sections, with the first section being that portion of the line occuring between times $t_1$ and $t_2$, the second section being that portion occuring between times $t_2$ and $t_3$, and the third section being that portion occuring between times $t_3$ and $t_4$.

In FIG. 4, there is shown a simplified representation of the faceplate 20 of the cathode-ray tube 10 with its longest dimension, and therefore the longest dimensions of its three phosphor bands 24–28, oriented vertically. This orientation is chosen only for ease of understanding the correlation between the display of FIG. 4 and the raster-scan presentation of FIG. 3 and is not meant to be limiting. As is discussed in more detail below, one function of the system of the present invention is to display the image segment 136 of FIG. 3 on the display screen 21 of the cathode-ray tube 10 with a first color component of the first section appearing in the phosphor band 24, a second component of the second section appearing in the phosphor band 26, and a third component of the third section appearing in the phosphor band 28. This is accomplished by recreating in the display area 21 the line segments 133 of FIG. 3 with the electron beam of the tube 10 modulated according to the particular image component being presented. In other words, assuming a three-color environment and the blue/green/red (BGR) phosphor orientation indicated earlier, from time $t_1$ to time $t_2$, the beam of the tube 10 is traversing the first (blue) phosphor band 24 while being modulated with blue image data, from time $t_2$ to time $t_3$ it traverses the second (green) band 26 while being modulated with green data, and from time $t_3$ to time $t_4$ it traverses the third (red) band 28 while being modulated with red data. In this manner, the image presented in the display area 21 of the tube 10 corresponds exactly, except for the separation and selection of the individual color components, to the image segment 136 of FIG. 3. The actual order and selection of the phosphor colors is, of course, a matter of design choice.

If the image segment 136 outlined in FIG. 3 is now moved to the right, as indicated by the arrow 142, by successively delaying the times $t_1-t_4$, the corresponding image produced in the display area 21 of the tube 10 will appear to move to the left, as indicated by the arrow 144, at the same rate. As the image is moved, the section originally appearing in, for example, the phosphor band 26 will move, at least partially, into the phosphor band 24. If a sensitized medium 120 is moved at the same rate in the same direction, as indicated by the arrow 116, the area of the medium exposed initially to the component of the image segment appearing initially in the phosphor band 26 will be exposed now to a different component of the same section as produced in the phosphor band 24. Such action will, of course, occur with respect to each of the three phosphor bands of the tube 10. Thus it will be apparent that as the displayed image and sensitized medium move or are scrolled across the display area 21 in timed synchrony, the medium will be successively exposed to each of the three components of each section of each image segment, thereby producing in the medium a hard-copy representation of the entire image as defined by the cumulative sum of its components. In this manner, any image definable in terms of a raster scan presentation and differentiable components can be reproduced in a properly sensitized medium in terms of the cumulative sum of those components.

Referring now to the block diagram of FIG. 5, there is shown an exemplary embodiment of the system of the present invention configured to process a conventional three-color raster-scan image. For ease of understanding, the system of FIG. 5 may be divided into five sections: an input section including a source 64 of image signals; an output section including the cathode-ray tube 10; a deflection section including a vertical ramp processor 52 and a horizontal ramp processor 54 for moving an electron beam in a raster-like manner across the screen of the tube 10; a data section including a gate generator 98, three signal switches 92, 94, 96, and a Z-axis amplifier 50 for modulating the beam of the tube 10 with the appropriate image data signal at the appropriate time; and a movement section including a timing ramp processor 60, a slow ramp processor 68, a comparator 66, and a media drive means 69 for causing both the displayed image and the sensitized medium to move across the screen of the tube 10 in mutual synchrony. Detailed operation of the system is best understood with reference to the waveforms of FIG. 6.

The source 64 may be any conventional source of signals defining a refreshed raster-scan image in terms of a preselected set of component, i.e., color, signals and their timing interrelationships. Examples of such a source include computer display devices and color television receivers. The timing signals from the source 64 are applied to a synchronizer 62 that provides, in turn, corresponding timing signals to the vertical ramp processor 52 and timing ramp processor 60 in synchrony with the image data signals that are applied to the three switches 92, 94, 96. The outputs of the vertical ramp processor 52 and timing ramp processor 60 are the conventional vertical and horizontal ramp of sawtooth deflection signals employed in the general case to produce a raster scan presentation on the display screen of a cathode-ray tube. The vertical ramp signal is applied directly to the vertical deflection yoke of the cathode-ray tube 10; however, as only a selected segment or time slice of the input image is to be displayed on the screen of the tube 10, the timing ramp signal, shown as waveform 80 in FIG. 6, is employed in combination with a slower ramp signal 82 produced by the slow ramp processor 68, to drive a separate horizontal ramp processor 54 that produces a shorter horizontal ramp signal, shown as waveform 86 in FIG. 6, that is actually used to deflect the beam of the tube 10 in the horizontal direction. The slower ramp signal, shown as waveform 82 in FIG. 6, is generated by the slow ramp processor 68 in response to activation of a copy switch 70.

As indicated in FIG. 6, the slope of the slow ramp signal 82 is significantly less than that of the horizontal ramp signal 80, and also that of the vertical ramp signal (not shown). In fact, the slope of the slow ramp 82 is sufficiently gradual as to be considered constant during the time required to produce several refreshed presentations of an image segment on the display screen of the cathode-ray tube 10. Whenever the value of the horizontal ramp 80 and slow ramp 82 coincide, as detected by the comparator 66 interposed between the ramp processors 60 and 68 and the horizontal ramp processor 54, a pulse 84 produced by the comparator activates the horizontal ramp processor to produce the shorter ramp signal 86 of magnitude and duration sufficient to deflect the electron beam of the cathode-ray 10 across the narrower dimension of its display area 21. This latter signal, the frequency of which is the same as that of the timing ramp signal 80, is applied directly to the horizontal deflection yoke of the tube 10 so as to produce in the tube, in combination with the vertical ramp signal from the vertical ramp processor 52, and suitable modulation of the beam density, the raster scan image segment 136 identified earlier with respect to FIG. 3.

The ramp processors 52, 54, 60, 68 may be of any suitable design and configuration. As such processors are conventional in the art, they need not be disclosed in detail herein. An example of a suitable circuit for the two ramp processors 52, 54 is a triggered Miller integrator the output of which is applied to a conventional two-state complimentary current amplifier operating within the limits of the selected cathode-ray tube 10 to deflect the electron beam over the desired area of the tube display screen. The comparator 66 may be any suitable circuit capable of comparing two ramp or sawtooth input voltage waveforms and producing a detectable pulse whenever the two input voltages coincide.

Referring now to the lower half of FIG. 5, the three image data signals 73, 74, 75 representing in FIG. 6 the three color components of a single raster line 132 of the image to be processed are applied from the source 64 to the three switch circuits 92, 94, 96, respectively. Operation of the three switches is controlled by a gate generator 98 in response to the same comparator signal 84 employed to produce the short ramp signal 86. Upon receiving the comparator pulse 84, the gate generator 98 produces three gating signals 100, 102, 104, also shown in FIG. 6, for activating in turn the color switches 92, 94, 96; the result of which is to cause selected portions 91, 93, 95 of the respective color signals 73, 74, 75 to be applied via a combining input 106 to the Z-axis amplifier 50 for further application to the Z-axis input of the cathode-ray tube 10. In this manner, each time the electron beam of the cathode-ray tube 10 traverses the three phosphor bands 24, 26, 28 of the display area 21 in the horizontal direction, its density will be modulated, assuming still the BGR orientation of the bands, first by the blue data signal 73 while the beam is traversing the blue band 24, second by the green data signal 74 while the beam is traversing the green band 26, and third by the red data signal 75 as the beam is traversing the red band 28. This is shown most clearly in FIG. 6 by a comparison of the gating signals 100, 102, 104 with the short ramp signal 86 and the resultant data signals 91, 93, 95. The waveform 88 in FIG. 6 indicates the operation of an electronic switch 72 which is activated in response to each comparator pulse 84 to gate the Z-axis information to the tube 10 only during the time that the corresponding short ramp signal 86 is being generated. To ease comparison of the diagrams of FIGS. 4 and 5, two arrows labeled V and H have been positioned adjacent the cathode-ray tube 10 in FIG. 6 to indicate the commonly defined vertical and horizontal directions.

The switches 92, 94, 96, the gate generator 98, and the amplifier 50 may be of any suitable design capable of performing the indicated function. For example, switches 92, 94, 96 may be integrated or discrete component selectors of an input analog signal responsive to a digital input, gate generator 98 may comprise three one-shot multivibrators activated in timed sequence, and amplifier 50 may be a quasi-differential feedback amplifier driving a cascode amplifier to control the voltage between the cathode 13 and the control grid 14 of the cathode-ray tube 10. Such circuits are well known to the art.

Assuming for the moment that the slow ramp processor is producing a constant output signal, the portion of the system of FIG. 5 described thus far will operate to produce on the display screen 21 of the tube 10 the display described earlier with reference to FIG. 4. If now, the slow ramp signal 82 is permitted to increase at a rate indicated earlier as being much slower than that of either the vertical ramp signal from the vertical ramp processor 52 or the horizontal ramp signal 80 from the timing ramp processor 60, the comparator signal 84 will begin to precess at a rate governed by the slope of the wave 82. This is shown most clearly at the top of FIG. 6 where the three waveforms 80, 82, 84 have been segmented to show their interrelationships during three different portions of the slow ramp signal 82. In the leftmost portion, the comparator signal 84 is seen to occur shortly after the beginning of each horizontal ramp signal 80, while in the center and right most portions it is seen to occur at successively later times during that signal. As the selection of each image segment 136 is keyed entirely on the occurence of the comparator signal 84, it will be apparent that as the signal 84 precesses in time, selected image segments 136 will move successively to the right in FIG. 3, and the resultant image produced on the screen of the cathode-ray tube 10 will move successively to the left with its color components separated according each phosphor band as described earlier. Thus, for each cycle of the slow ramp signal 82, the entire raster scan presentation 130 of FIG. 3 will move across the display area 21 of the cathode-ray tube 10.

As indicated in FIG. 5, the slow ramp signal 82 is also applied to a driver means 69 for causing a sensitized sheet medium 120 to move past the display area 21 at the same rate and in the same direction, as indicated by the arrows 116, as the movement of the displayed image. During such movement, the sensitized surface of the medium 120 is exposed sequentially and cumulatively to each color component of each successive image segment, and therefore of the entire image. As the ramp signal 82 is much slower than the two deflection signals applied to the cathode-ray tube 10, several iterations of each image segment will actually be presented to the medium during each copy cycle, thereby permitting the exposure to be controlled by varying the speed of the slower ramp signal 82. In a conventional interlaced television environment, for example, the frequencies of the vertical and horizontal ramp signals are 30 Hz and 15,750 Hz, respectively, while the duration of a single slow ramp 82 is on the order of seconds.

The driver means 69 may include any suitable means, such as an electric motor, for moving the medium in the desired direction at the desired speed. The medium 120 may be of any material, for example, photographic film or other media known to the art, sensitive to the energy radiated by the three phosphors of the tube 10 upon energization by the moving beam.

The entire raster scan image represented by the signals from the source 64 may be copied anew each time the copy switch 70 is activated to produce a new ramp signal 82. It is understood, of course, that the information being copied must remain constant for the full duration of each slow ramp.

The dotted line 140 in FIG. 5 indicates that a monochromatic image may be copied by applying the single data signal representing the image directly to the input of the Z-axis amplifier 50 as there is no need for the single monochromatic signal to be processed by the color switches 92, 94, 96 or the gate generator 98. Other than for the direct application of the single data signal to the Z-axis amplifier 50, a monochromatic image is processed essentially as is the color image described earlier.

Although the system of the present invention has been discussed in terms of processing a vertical segment of an input image signal, it is equally capable of processing a horizontal segment of such an image. If, for example, the functions of the vertical ramp processor 52 and the timing ramp processor 60 are interchanged; that is, the processor 52 is operated at the faster horizontal rate and the processor 60 at the slower vertical rate, the image segment produced on the display screen 21 of the cathode-ray tube 10 will comprise, rather than a long series of short line segments, a shorter series of complete lines, with the first m lines being generated, for example, in the blue phosphor band 24, the second m lines being generated in the green band 26, and the third m lines being generated in the red band 28. The changes in the time operation of the gate generator 98, the signal switches 92-96, and the Z-axis switch 72 necessary to accomplish such alternate processing should also be apparent to those persons skilled in the art upon gaining an understanding of the earlier described processing of a vertical image segment. Such changes comprise, principally, the activation of each switch 92-96 in sequence for a time sufficient to permit the passage of m lines of image information, and the activation of switch 72 once for each line. This latter change is accomplished most easily by triggering the switch with a signal from the ramp processor 52 rather than from the comparator 66.

It is understood that, although the system of the present invention and the method of its use have been described in terms of a three-color image, the scope of the invention as disclosed is not so limited. In general, an input signal defining an image in terms of n components may be processed by a system of the type disclosed having n input signal switches, a gate generator capable of producing n sequential gate signals for each cycle of the horizontal ramp signal, and a cathode-ray tube having a display screen formed of n adjacent strips of n different phosphors, without departing from the scope of the invention as disclosed.

The terms and expressions which have been used in the foregoing specification are used therein as terms of description and not of limitation, and there is no intention, in the use of such expressions, of excluding equivalents of the features shown and described or portions thereof, it being recognized that the scope of the invention is defined and limited only by the claims which follow.

I claim as my invention:

1. A system for producing an image on a sensitized surface, comprising:
   (a) a cathode-ray tube having a faceplate defining a plurality of display areas;
   (b) means for generating a first preselected component of a first section of an image within a first one of said display areas and a second preselected component of a second image section within a second one of said display areas; and
   (c) means for causing said sections of said image to move across said display areas so as to successively generate in each said area the corresponding component of each said section.

2. The image-producing system of claim 1 wherein said display areas define adjacent elongate bands, and wherein said image-movement means (c) includes means for causing said image sections to move across said bands in the direction of the shortest dimensions of said bands.

3. The image-producing system of claim 1 wherein said cathode-ray tube includes a single electron gun for forming a single electron beam, and wherein said image-generating means (b) includes means for causing said beam to sweep across each of said display areas in sequence.

4. The image-producing system of claim 2 wherein said image-generating means (b) includes means for causing a single electron beam to sweep simultaneously across said bands in a first direction at a first rate and in a second direction at a second slower rate.

5. The image-producing system of claim 4 wherein said first direction is perpendicular to and said second direction is parallel with the longitudinal axes of said bands.

6. The image-producing system of claim 4 wherein said first direction is parallel with and said second direction is perpendicular to the longitudinal axes of said bands.

7. The image-producing system of claim 1 further comprising means for receiving an electrical signal defining said image in terms of a like plurality of differentiable components, and wherein said image-generating means (b) operates in response to said signal.

8. The image-producing system of claim 1 wherein each of said phosphorescent materials is selected to produce upon excitation radiant energy having a wave length different from that produced by the other of said materials.

9. The image-producing system of claim 8 wherein said display areas and said phosphorescent materials are three in number and are selected so as to produce upon excitation radiant energy having a wavelength in the blue, green, and red spectrums, respectively.

10. The image-producing system of claim 3 wherein said image-generating means (b) includes means for receiving a like plurality of electrical signals, each of which represents a particular component of a section of an image to be produced, means responsive to said signals for modulating the density of said electron beam, and means for gating each of said signals from said receiving means to said modulating means in timed sequence with said sweep-causing means such that the density of said beam is modulated by a first one of said signals as said beam is caused to sweep across a first one of said phosphorescent materials and a second one of said signals as said beam is caused to sweep across a second one of said materials.

11. An improved image-producing system of a type including a cathode-ray tube having a faceplate with a first phosphorescent material deposited thereon, means for sequentially generating different sections of an image at said faceplate by exciting said phosphorescent materials, means for exposing a sensitized surface to an image portion generated at said faceplate, and means for causing said image sections and said sensitized surface to move across said faceplate in mutual synchrony so as to sequentially expose said surface to each section of said image, wherein the improvement comprises:
   (a) a second phosphorescent material deposited on said faceplate adjacent first phosphorescent material, each of said materials being selected to produce upon excitation radiant energy having a wavelength different from that produced by the other of said materials;
   (b) means within said image-generating means for generating a preselected component of said image sections within said first phosphorescent material and a different preselected component of said image sections within said second phosphorescent material; and
   (c) means within said movement-causing means for causing said image portions and said sensitized surface to move across said faceplate in a direction traversing each of said phosphorescent materials.

12. A method of producing an image on a sensitized surface comprising the steps of:
   (a) providing a cathode-ray tube having a faceplate defining a plurality of display areas;
   (b) generating a first preselected component of a first section of an image within a first one of said display areas and a second preselected component of a second section within a second one of said display areas; and
   (c) causing said sections of said image to move across said display areas so as to successively generate in each said area the corresponding component of each said section.

13. The image-producing method of claim 12 wherein said step (a) includes arranging said display areas over the faceplate of said cathode-ray tube in a manner defining adjacent elongate bands, and wherein said step (c) includes causing said image sections to move across said bands in the direction of the shortest dimensions of said bands.

14. The image-producing method of claim 12 wherein said step (a) includes providing said cathode-ray tube with a single electron gun for forming a single electron beam, and wherein said step (b) includes causing said beam to sweep across each of said areas in sequence.

15. The image-producing method of claim 14 wherein said step (b) includes causing a single electron beam to sweep simultaneously across said bands in a first direction at a first rate and in a second direction at second slower rate.

16. The image-producing method of claim 15 wherein said first direction is perpendicular to and said second direction is parallel with the longitudinal axes of said bands.

17. The image-producing method of claim 15 wherein said first direction is parallel with and said second direction is perpendicular to the longitudinal axes of said bands.

18. The image-producing method of claim 12 further comprising the step of receiving an electrical signal defining said image in terms of a like plurality of differentiable components, and wherein said step (b) is performed in response to the receipt of said signal.

19. In an image-producing method of a type wherein successive sections of an image are generated within a first phosphorescent material deposited on the faceplate of a cathode-ray tube, and a sensitized surface is exposed to said faceplate and said image sections generated thereat while said image sections and said sensitized surface are cuased to move across said faceplate in mutual synchrony so as to expose said surface to each said image section, the improvement comprising the steps of:

(a) providing said cathode-ray tube with a second phosphorescent material deposited on said faceplate adjacent said first phosphorescent material, each of said materials being selected to produce upon excitation radiant energy having a wavelength different from that produced by the other of said materials;

(b) generating a preselected component of a first image section within said first phosphorescent material and a different preselected component of a second image section within said second phosphorescent material; and (c) causing said image sections and said sensitized surface to move across said faceplace of said cathode-ray tube in a direction traversing each of said phosporescent materials so as to sequentially expose said surface to each said component of each said image sections.

20. The image-producing system of claim 1 wherein each said display area commmprises a phosphorescent material deposited over a separate area of said faceplate.

21. The image-producing system of claim 1 further comprising means for causing a sensitized surface to move adjacent said faceplate in the same direction and at the same rate as the direction and rate of said image sections so as to successively expose said surface to each said component of each said image section.

22. The image-producing method of claim 12 further comprising the step of causing a sensitized medium to move adjacent said faceplate in the same direction and at the same rate as the direction and rate of said image sections so as to successively expose said medium to each said component of each said image section.

* * * * *